Nov. 20, 1962     H. F. SCHENEMAN     3,065,010
RING COUPLING FOR OVERLAPPED THREADED RODS
Filed May 16, 1960
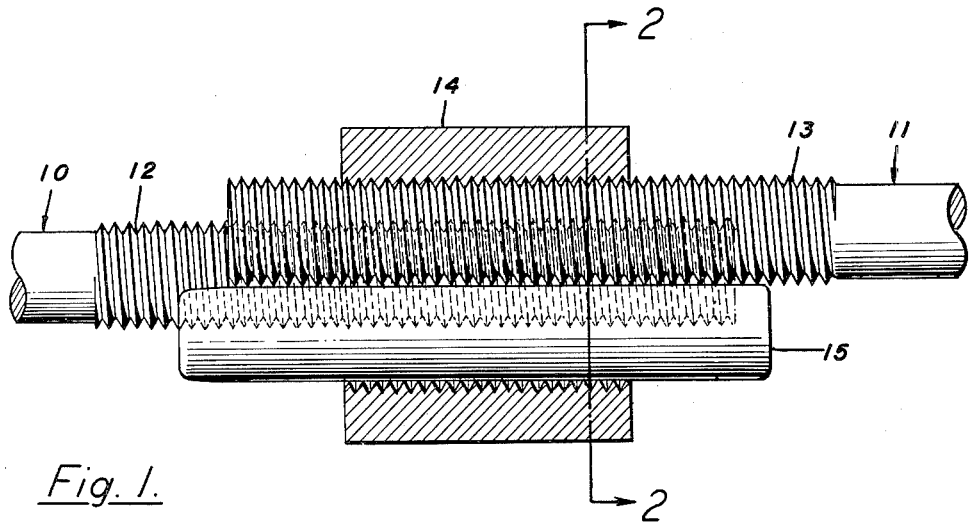
Fig. 1.
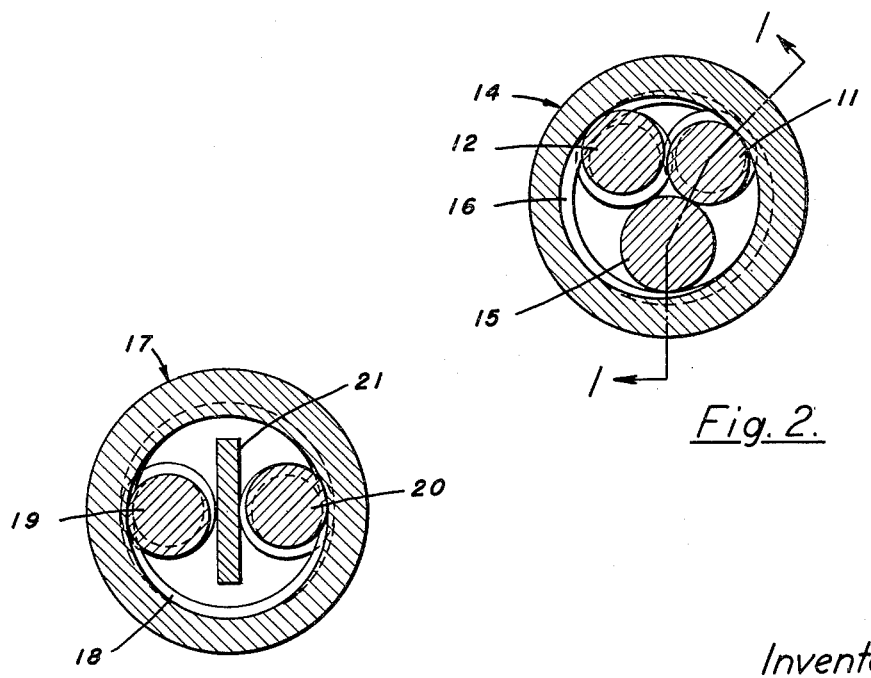
Fig. 2.
Fig. 3.
Inventor
HENRY FRANK SCHENEMAN.
by
Attorney

United States Patent Office 3,065,010
Patented Nov. 20, 1962

3,065,010
RING COUPLING FOR OVERLAPPED THREADED RODS
Henry Frank Scheneman, Rte. 1, Sparta, Mich.
Filed May 16, 1960, Ser. No. 29,298
4 Claims. (Cl. 287—117)

This invention provides for connecting overlapped threaded rods for the transmission of either tension or compression. The preferred form of this invention has been developed in conjunction with bracing for forms used in pouring concrete. Situations are often encountered where forces must be transferred from an anchoring point to a form structure, and rods leading from each of these must be connected in some manner. It is conventional practice either to weld the rods together, or cut them to such length as to permit a coaxial connection fitting to be used. Welding becomes impractical because these connections frequently must be made where it is extremely difficult to extend the necessary lines, and the operation of cutting the rods to length becomes a strong argument against the coaxial coupling.

The obvious advantage of any form of overlapped coupling is the omission of a cutting operation; but to avoid rotation of the coupling under severe stress, it becomes very important to keep the rods as close together as possible. In the case of threaded overlapped rods, the present invention establishes a coupling which satisfies this requirement, and is very simple to apply. In general terms, a ring-shaped member is slipped over the rods so that it surrounds an overlapped portion. A pin is then driven into the space existing between the inside diameter of the ring and the rods themselves, and the pressure created by this member in bearing against the inside of the ring drives the overlapped threaded portions of the rod into close engagement for the transfer of stresses. In the preferred form of the invention, the inside diameter of the ring is also threaded, which provides for the transfer of some of the stress through the ring member. The several features of the invention will be analyzed in further detail through a discussion of the particular embodiments illustrated in the accompanying drawing. In the drawing:

FIGURE 1 presents a sectional elevation of the preferred form of the invention in the fully-engaged condition.

FIGURE 2 is a section taken on the plane 2—2 of FIGURE 1.

FIGURE 3 is a similar section to that of FIGURE 2, but illustrating a modified form of the invention.

Referring to the drawing, the overlapped rods 10 and 11 are provided with the threaded portions 12 and 13, respectively. To establish the coupled condition shown in FIGURE 1, the rods are manually separated sufficiently for the ring 14 to be slipped over one of them and moved axially far enough for the rods to be brought together in the illustrated condition. The ring is then moved axially in the opposite direction so that it surrounds a portion of the overlapped threaded sections of the rods. A pin 15 is then forceably driven into position in the space inside the ring 14, preferably with the blows of a hammer. The effect of this is (a) to drive the threaded portions 12 and 13 into firm interengagement, and (b) to interengage the threaded portion 12 and 13 with the thread system indicated at 16 within the ring 14.

If the geometry of FIGURE 2 is carefully examined, it will be recognized that the presence of the pin 15 will create pressures on the sections 12 and 13 of the rods to move them together. This results from the fact that the pressures on the round surfaces are essentially radial with respect to each of the rods, and this applies both to the pressure contributed at the ring 14 and at the pin 15. The resultant of the forces from both of these sources creates a vector tending to move the rods into close interengagement.

It is obvious that the pitch of the threads of the sections 12 and 13 must be substantially the same for any such interengagement to take place. The pitch of the internal thread system 16 of the ring should also be substantially the same; but even at that, there is a probability that the threaded portions 12 and 13 will not at the same time mesh exactly with each other and with the internal threads 16 of the ring. This is due to the difference in the helix angles of the threads 16 and that of the threaded portions 12 and 13. A certain amount of deformity of the thread systems takes place on the forced insertion of the pin 15, and the effectiveness of the coupling does not require a complete interengagement of all of the thread systems. When the illustrated preferred form is used, a double transfer of stress results. One of these is the direct transfer existing between the interengaged thread systems 12 and 13, and the other involves the forces which may pass from the threaded portion 12 into the ring 14, and from there back to the threaded portion 13.

In the modification shown in FIGURE 3, the ring 17 becomes the sole medium for the transfer of forces. The internal thread system shown at 18 is engaged by the threaded portions 19 and 20 of overlapped rods, these portions being held in engagement with the internal thread system 18 of the ring by the wedge member 21. In this situation, there is practically no direct transfer of coupling forces across between the rods, since the wedge member is essentially a flat piece whose entire function is maintaining the engagement of the rods with the ring threads.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A coupling comprising a pair of rods having overlapping helically threaded portions of cylindrical cross section; an internally threaded ring member surrounding said overlapping portions of said rods, with the internal thread-system of said ring member of similar pitch and hand to the thread systems of said rods; said ring member having a minimum diameter large enough to be slidable over the overlapping threaded portions of said rods; and a locking member received axially in said ring member in forced-fit relationship against said rods and the side of said ring member, whereby the threads on said rods mesh with the threads of said ring member to maintain said rods in fixed axial relationship.

2. A coupling comprising a pair of rods having overlapping helically threaded portions of cylindrical cross section; a ring member surrounding said overlapping portions of said rods; said ring member having a minimum diameter large enough to be slidable over the overlapping threaded portions of said rods; and a locking member received axially in said ring member in forced-fit relationship against said rods and the side of said ring member, whereby the threads on said rods engage said ring member to maintain said rods in fixed axial relationship.

3. A coupling comprising a pair of rods having overlapping helically threaded portions of cylindrical cross section; an internally threaded annular ring member surrounding said overlapping portions of said rods, with the internal thread-system of said ring member of similar pitch and hand to the thread systems of said rods; said ring member having a minimum diameter large enough to be slidable over the overlapping threaded portions of said rods; and a locking member received in said ring member in forced-fit relationship between said rods and the side of said ring member, whereby the threads on said rods mesh with the threads of said ring member to maintain said rods in fixed axial relationship.

4. A coupling comprising a pair of rods having overlapping helically threaded portions of cylindrical cross section; an internally threaded ring member surrounding said overlapping portions of said rods, with the internal thread-system of said ring member of similar pitch and hand to the thread systems of said rods; said ring member having a minimum diameter large enough to be slidable over the overlapping threaded portions of said rods; and a locking member received in said ring member in forced-fit relationship against said rods, whereby the threads on said rods engage said ring member to maintain said rods in fixed axial relationship.

References Cited in the file of this patent
UNITED STATES PATENTS

| | | |
|---|---|---|
| 421,570 | Heiser | Feb. 18, 1890 |
| 671,829 | Lewis | Apr. 9, 1901 |
| 2,352,297 | Wales | June 27, 1944 |